Feb. 12, 1957 T. H. TROLLER 2,781,124
YIELDABLY MOUNTED SUSPENSION TROUGHING IDLER
Filed Oct. 19, 1951 2 Sheets-Sheet 2
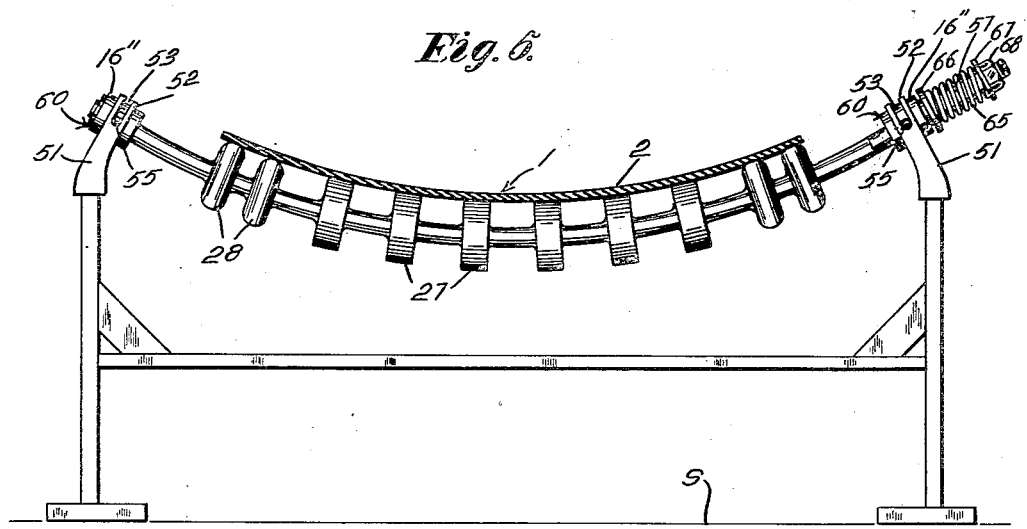
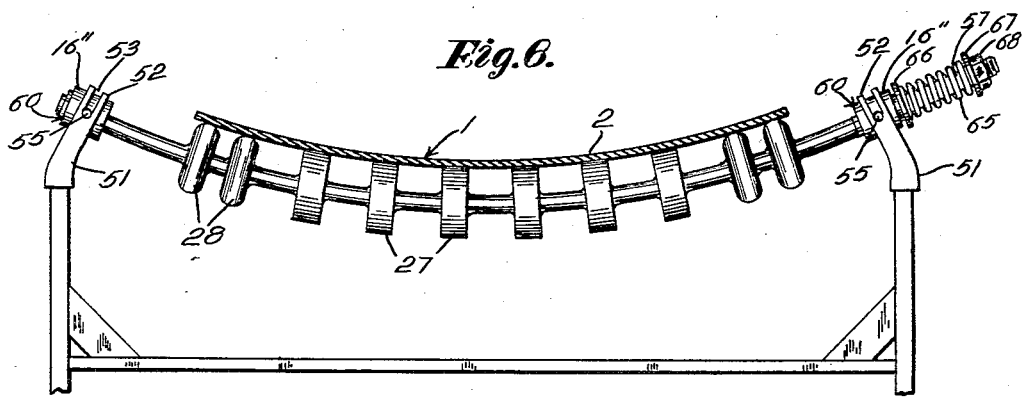
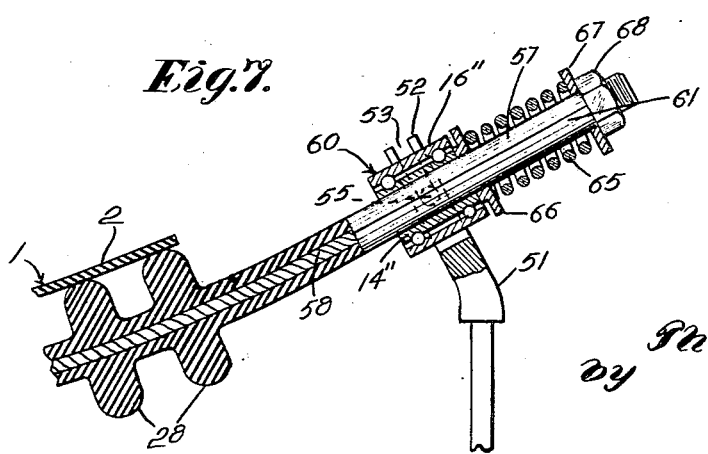
Inventor:
Theodor H. Troller.
by
Louis A. Maxon.
Attorney.

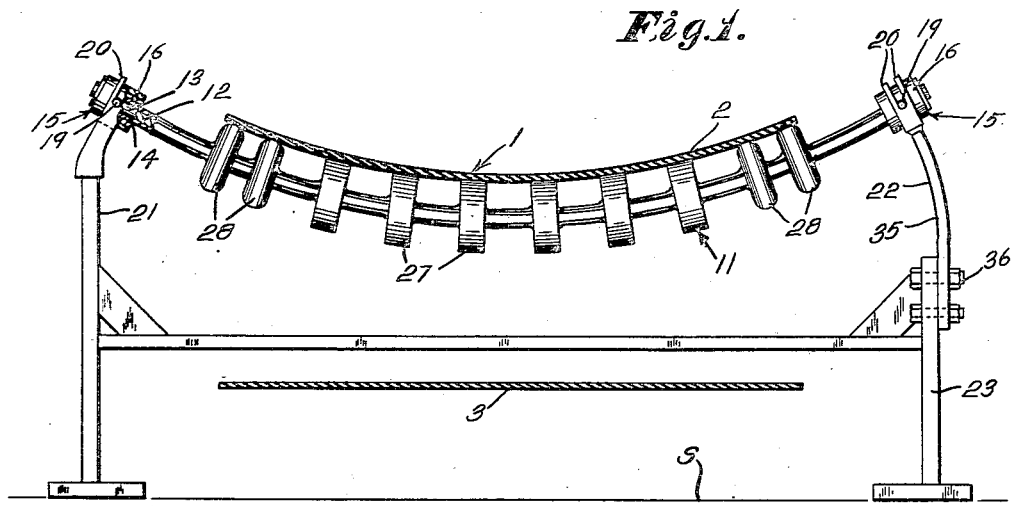
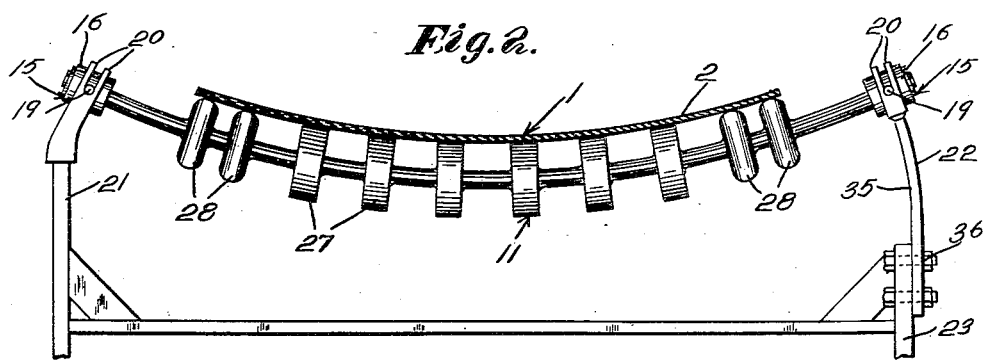
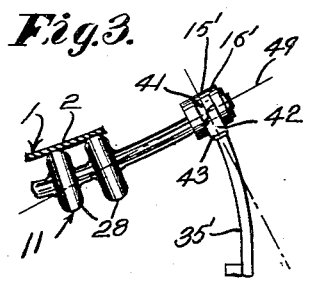
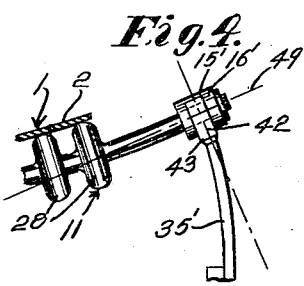

United States Patent Office 2,781,124
Patented Feb. 12, 1957

2,781,124

YIELDABLY MOUNTED SUSPENSION TROUGHING IDLER

Theodor H. Troller, Akron, Ohio, assignor to Joy Manufacturing Company, Pittsburgh, Pa., a corporation of Pennsylvania Application October 19, 1951, Serial No. 252,014

2 Claims. (Cl. 198—192)

This invention relates to troughing idlers for conveyor belts, and more particularly to troughing idlers of the suspension type.

A desirable form of troughing idler comprises a flexible element—a piece of wire cable is very satisfactory—having a number of idler rollers fixed to it at various points along its length. It has been customary to have these flexible elements rotatably supported at their opposite ends in bearings carried by fixed supports, and the curvature of the flexible elements has been predetermined, assuming proper belt loading and tension, by the length of the flexible element between the bearings and the spacing of the latter. If the belt which these idlers support and guide is properly tensioned and the thickness of the belt, and the load it is to carry and the curvature of the suspension troughing idlers are properly related, the belt will be supported by the spaced idler rollers of the suspension troughing idlers all across its width, but circumstances such as greatly underloading the belt, wide variations in its tension, etc. may result in the portion of the belt midway between the ends of the suspension idlers lifting out of contact with the idler rollers and impairment of the intended operation.

To avoid such occurrences, I provide means for supporting the troughing idlers which automatically varies their curvature in vertical transverse planes as the load changes, permitting a greater degree of troughing with heavier loads and a flattening of the transverse curvature when there is lighter loading, and causing the more centrally disposed idler rollers, from which the belt tends to lift away under light loading, to be raised more than the outermost rollers and to maintain supporting contact with the central portions of the belt. In the use of the term loading it is to be understood that I have in mind both the changes that may be occasioned by variations in load of material carried and also other variations, such as in the general tautness of the belt between its drive and reverse rollers.

The invention may be practiced in various ways, and the special provisions for varied positioning of an end of the troughing idlers may be made at either or both ends of the suspension idler elements. Some advantages inhere in having one end of each suspension idler element rotate in a fixed relation to its mounting, but whether the same ends are always so mounted, or whether some are so mounted at one end and others at the other end, or whether both ends are so-to-speak adjustably mounted, and whether the bearings as a whole are yieldably mounted, or there is provision for axial yielding between the relatively rotatable parts of one or both bearings is all within the ambit of my invention.

A desirable embodiment includes an arrangement in which a flexible suspension idler element, provided with spaced idler rollers, has one end rotatably supported in a bearing which is fixed as to movement longitudinally—axially—of the idler element, while the supporting and journalling means for the other end of the idler is arranged to permit that end of the idler element to move longitudinally under varying loads, and to be retracted under light loads and moved towards the other end of the idler element under heavier loads. Desirably, provision will be made to maintain the axis of that end of the idler element tangent to the curve of the curved portion of the idler element at its adjacent end, and this may be done by the use of trunnion supported bearings, or mounting the bearing in rigid relation to it upon an end of a leaf or flat spring of suitable characteristics to have it appropriately inclined and maintained at all times in effect perpendicular to the axis of the bearing. Flat or leaf springs forming a bearing-maintaining bracket may be employed, or helical springs acting between the relatively rotatable parts of a bearing may be employed when one of the bearing parts is of such length relative to the other as to permit relative axial movement.

From the foregoing, it will be apparent that a primary object of my invention is to provide an improved suspension idler adapted automatically to adjust its curvature to the loads to be supported thereby to maintain effective belt support across the full width of the latter despite load variations, and, incident to said primary object, to provide improved supporting means for such idler elements as to enable and insure the improved operation. Specific objects will appear in the course of the ensuing description and from the appended claims.

In the accompanying drawings, in which for purposes of illustration there are shown three forms which my invention in its broader aspects may assume in practice.

Fig. 1 is a transverse sectional view through the upper and lower runs of a belt conveyor showing an embodiment of my improved supporting means for the upper run thereof, including both a suspension troughing idler and a stand supporting the latter, no support for the return run of the belt being illustrated, and the suspension troughing idler being disposed (curved) as it is with a relatively heavily loaded belt.

Fig. 2 is a fragmentary view similar to Fig. 1, showing, however, only the upper run of the belt conveyor, and showing the latter and the suspension troughing idler disposed and curved as, for example, with a lighter belt loading.

Figs. 3 and 4 are fragmentary elevational views of a modified journaling and supporting arrangement for one end of the suspension troughing idler for the upper run of a conveyor belt, a fragment of the troughing idler and of a supported belt being shown, and respectively showing the belt in a relatively heavily loaded condition and in a more lightly loaded condition.

Figs. 5, 6 and 7 show a further embodiment of the invention, Fig. 5 being a view similar to Fig. 1 with the return run of the belt omitted, but showing a still different journaling and supporting means for a suspension troughing idler having its journaling in a bearing modified to provide for automatic variation, under belt load or tension changes, of the transverse curvature of the supported belt;

Fig. 6 being a view of the embodiment of Fig. 5, the return run of the belt being omitted and the curvature of belt and troughing idler corresponding to the belt loading and/or tensioning of Fig. 2; and Fig. 7 being a considerably enlarged section, on the plane in which the axial line of the troughing idler lies, showing details of the automatic adjusting means at the adjustably mounted end of the idler.

Referring now to the drawings and noting first Figs. 1 and 2, there will be seen a belt conveyor generally designated 1 and including an upper active troughed run 2 and a lower flat return run 3, the latter shown only in Fig. 1. No guiding arrangement for the return run is illustrated, as any of numerous suitable conventional return run supporting and guiding devices may be employed.

The upper, active troughed run 2 of the belt 1 is supported by a suspension troughing idler 11. This may desirably include a steel cable 12 to the ends of which there are connected, as by peening, sleeve elements 13. These last are received snugly, and desirably with a press fit, within the inner races 14 of ball bearings 15, and releasably held in any suitable manner against inadvertent release, as by snap rings; and the outer races 16 of these bearings are shown in Figs. 1 and 2 as provided with trunnion mountings by means of pins 19 received in forks 20 arranged at the upper ends of support arms 21 and 22 carried on a bracket or frame 23 which is adapted to be supported on any suitable subjacent surface S, shown as a mine floor. Desirably the cable may be covered with neoprene between suitably formed and spaced disc or roller portions 27, 27 and 28, 28, which are designed to underlie and support the upper conveyor belt run 2. The structure of the suspension troughing idler proper as so far described may be identical, except for the trunnion mountings of the races, with the one more fully described in a copending application of George Baechli, Serial No. 224,185, owned by my assignee.

Circumstances may be encountered, as where far from uniform belt loading is maintained, in which the transverse belt curvature may vary rather widely, and if the length of the suspension troughing idler is not capable of adjustment or if there be no adjustability between end bearings occupying a fixed relation, except as to rotation, with respect to the idlers, there may be at times a condition in which the belt is fully supported by the rollers on the idler, and at other times, since the curvature of the idler will tend to remain more or less the same, while the troughing of the belt proper may be much shallower, there may be a lifting of the central portions of the belt out of cooperative relation with the idler rollers near the longitudinal center of the idler. As will appear hereinafter, this situation may be avoided in more than one way. One or both of the end bearings may be adjustably supported, so that as their spacing varies the arcuate curvature of the idler can be varied. Again, one or both ends of the idler may have a bearing portion adjustably mounted with respect to another bearing portion, the latter bearing portions mounted a fixed distance apart, with means tending always to pull the bearing portion attached to an end of the idler as far as possible outwardly with respect to its associated bearing. In either case duplication of the adjustable feature at each side of the belt may be effected if desired. A combination of the two types of adjustability is obviously feasible. Whether to confine adjustability to one side or to provide it at both sides of the belt is a matter to be determined by particular conditions. Where adjustment is confined to one end of the idler, possibly greater stability is provided, but a very slight lateral change in the central longitudinal line of the upper run of the belt may then attend wide load variations.

Now, reverting to Figs. 1 and 2, it will be noted that I have illustrated one bearing 15 relatively fixed as regards lateral positioning relative to the other, and each is free to tilt in its trunnion mounting so that the bearings can never bind due to tendency of the inner and outer races to get their axes out of a common line.

The right-hand support 22 is herein shown as a flat spring 35—which may be a leaf spring if load conditions so indicate. The spring 35 is mounted solidly at 36 upon the bracket 23, and the flexibility of the spring 35 is made such as to permit the flexure inward depicted in Fig. 1 under heavy belt loading, while its resiliency is such as to cause it to tend to straighten as shown in Fig. 2 when the belt loading is reduced. The spring must be flexible enough to yield as necessary, but must have the strength both not to yield too much and to take some of the arc out of the idler as load reduction occurs and thus maintain all of the rollers 27, 28 in supporting relation to the lower side of the belt.

By suitable selection (design) of the spring it may have the bearings 15′ positioned by chordal slots 41 receiving prongs 42 of a fork 43 at the upper end of the spring 35′, and the yield of the spring will be made such that the axis of the outer bearing race 16′ will at all times remain tangential to the curve (the catenary) of its axis of the suspension idler at the adjacent end of such curve. This arrangement is shown in Figs. 3 and 4, in which it will be noted that the axis 49 of the bearing changes its inclination relative to the horizontal as the spring element 35′ flexes, tilting counterclockwise as the arc of the idler becomes deeper and clockwise as the troughing of the supported belt becomes shallower.

In each of the embodiments so far described in some detail the bearings are in fixed relation—longitudinally—with respect to the idler. Such an arrangement is not necessary, however, as Figs. 5, 6 and 7 clearly show. Here again the bearing adjustment is shown only at one end of the idler, but it may obviously be not so confined. The bearing brackets 51 are relatively inflexible, and each has a fork 52 at its upper end having the arms of the fork slotted as at 53 and pivotally supporting trunnion pins 55 on the outer bearing element 16″. At the right-hand end of the idler there is provided a considerably longer cylindrical sleeve, 57, than is shown in lower numbered figures, this being secured as by peening to the end of a cable 58. The sleeve is slidably received in the inner race 14″ of a ball bearing 60, and may be held against turning with respect to the latter by a splined connection including a splineway 61 in the sleeve 57 and a coacting key or spline (not shown) internally of the inner race 14″. The outer bearing sleeve 16″ carries the alined trunnion pins 55, and these are pivotally mounted in the slots 53 formed in the opposite arms of the fork 52 mounted on the bracket as previously mentioned. The cylindrical sleeve is constantly pulled outwardly with respect to the bearing sleeves as by a spring 65 surrounding it and acting between washers 66 and 67 respectively resting against the inner bearing 14″ and a nut or other suitable stop 68 at the outermost end of the cylindrical member. Obviously because of the trunnion mounting described the axis of the cylindrical sleeve 57 will assume a position tangent to the adjacent end of the curve of the wire cable and this will be true whether the sleeve 57 moves inwardly under heavy belt loadings as indicated in Figs. 5 and 7, or to an outer position as shown in Fig. 6.

In each of the several forms of the invention which have been disclosed for purposes of illustration the bearing axes at each adjustable end of an idler remain tangent to the curve of the axial line of the near end of the idler cable, in each there is relative movement between the opposite ends of the idler providing for altered curvature with varied loads, and in each there is automatic flattening of the curvature of the idler and maintenance of support at the central portion of the belt, when load reduction permits the spring means coacting with the adjustable end of the idler to pull it outwardly. It is again to be noted that the adjustments, though shown located at one side of the supported belt only, may equally well be provided at both sides.

One further point may be mentioned. It wil be appreciated that the suspension troughing idlers of this application may be used as impact idlers and where shock loads occur. Under such circumstances, there may, of course, be provided additional means to accommodate the special conditions. For example, any suitable means normally maintaining the bearing mountings in a predetermined position but yieldable under certain loads and returning the bearing mountings to such predetermined positions upon the termination of such loads may be incorporated in the supports, and provide for yielding vertically, or for yielding normally to the tangent to the cable where it enters the bearings, or for angular movement about axes—as for example—inclined axes. An excellent arrangement makes use of rubber in shear. For example, when vertical yield is to be provided, a coaxial sleeve and rod connected together by a rubber annulus bonded to the exterior surface of the rod and to the interior surface of the sleeve may be arranged at any convenient point between the bottom of the support and the bearing supports, with either the sleeve or the rod connected to and carrying the bearing support and the other connected to and supported by the stationary part of the main support.

While there are in this application specifically described three forms which the invention may assume in practice, it will be understood that these forms of the same are shown for purposes of illustration and that the invention may be modified and embodied in various other forms without departing from its spirit or the scope of the appended claims.

What I claim is:

1. In combination, a suspension belt-troughing idler including a flexible element having idler roller means supported on it and fixed relative to it for rotation therewith and providing annular belt-supporting surfaces at various points spaced from each of its opposite ends, said flexible element having bearings at its opposite ends including bearing portions rotating with said element as the latter turns and cooperating portions rotatably supporting said first mentioned bearing portions, and means for supporting said cooperating portions including a leaf type spring at at least one end of said flexible element, on which spring the cooperating portion of the bearing at that end is mounted in a position perpendicular to a tangent to the leaf spring adjacent the bearing supporting end of the latter.

2. In combination, a suspension belt-troughing idler including a flexible element having idler roller means supported on it and fixed relative to it to rotate therewith and providing annular belt-supporting surfaces spaced from each of its opposite ends, said flexible element having at its opposite ends means for rotatably supporting it for turning on axes tangent to the axes of the ends of a catenary to which the axis of said flexible element conforms in variously loaded conditions of said belt-troughing idler, at least one of said means for rotatably supporting said flexible element including a spring increasingly flexed as the curvature of said element increases and so arranged that a tangent to its curvature at its end nearer said catenary is normal to a tangent to said catenary.

References Cited in the file of this patent

UNITED STATES PATENTS

| 909,833 | Vrooman | Jan. 12, 1909 |
| 981,471 | Proal | Jan. 10, 1911 |
| 2,277,402 | Hoeck | Mar. 24, 1942 |
| 2,555,765 | Shank | June 5, 1951 |

FOREIGN PATENTS

| 53,825 | Germany | Sept. 15, 1890 |
| 534,044 | Great Britain | Feb. 26, 1941 |